3,555,027
WATER SOLUBLE PYRENE FIBRE-REACTIVE
DYESTUFFS
Karl Seitz, Oberwil, Switzerland, assignor to Ciba Limited, Basel, Switzerland, a company of Switzerland
No Drawing. Filed July 22, 1968, Ser. No. 746,315
Claims priority, application Switzerland, July 28, 1967,
10,711/67
Int. Cl. C07d 51/36
U.S. Cl. 260—256.5         2 Claims

ABSTRACT OF THE DISCLOSURE

Water soluble pyrene dyestuffs containing a fibre-reactive radical, which consists of a 2,6-dichloro-5-pyrimidine-residue, bound via a methyleneaminobridge; are valuable for dyeing and printing both natural and synthetic textile materials.

---

The present invention provides new water-soluble fibre-reactive pyrene dyestuffs which contain at least one sulphonic acid group and at least one group of formula

wherein R denotes alkyl, aralkl, cycloalkyl or especially hydrogen and Z denotes a fibre-reactive residue.

Fibre-reactive residues which may be particularly mentioned are heterocyclic residues which contain at least one halogen atom, for example a 2,6-dichloro-5-pyrimidine residue or a 2,6-dichloro-4-methyl-5-pyrimidine residue, or the corresponding bromopyrimidine residues.

Particularly valuable dyestuffs are those of formula

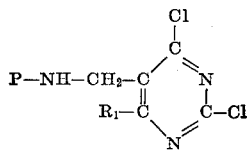

wherein P denotes the residue of a pyrene sulphonic acid, especially a pyrene trisulphonic acid, and $R_1$ denotes a low molecular weight alkyl group or especially hydrogen.

The new dyestuffs may be obtained for example when an aminopyrene sulphonic acid is alkylated with a heterocyclic compound which contains at least one substituent which is directly bound to a ring carbon atom and furthermore at least one removable substituent which is bound via a methylene group, for example a halogen atom, and if desired replacing a mobile halogen atom in the compound thus obtained by another group, for example a methylsulphonyl group, in such a manner that the final product preferably still contains at least one halogen atom directly bound to a carbon atom of the heterocyclic ring.

The following may for example be mentioned as such heterocyclic compounds: 2,6-dichloro-5-chloromethylpyrimidine, 2,6-dichloro-4-methyl-5-chloromethylpyrimidine as well as the corresponding bromine derivatives, 2,6-dichloro-5-sulphomethylpyrimidine or 2,6 - bis - methylsulphonyl-5-methylsulphonylmethpyrimidine.

3-aminopyrene-5-sulphonic acid, 3-aminopyrene-5,8-disulphonic acid or 3-aminopyrene-5,10-disulphonic acid, or especially 3-aminopyrene-5,8,10-trisulphonic acid may be mentioned as aminopyrene sulphonic acids suitable for the present process. They can be obtained according to known methods, for example by sulphonation of the corresponding aminopyrenes or from pyrenetetra sulphonic acid by partial replacement of a sulphonic acid group by an amino group.

The reaction or alkylation of the aminopyrene sulphonic acids with the fibre-reactive chloromethyl compounds may also be effected according to known methods, advantageously in the presence of acid-binding reagents for example sodium acetate, sodium hydroxide or sodium carbonate, and under such conditions that the fibre-reactive group in the final product is not destroyed (for example by splitting-off of a labile halogen atom). The alkylation is effected in the presence of organic solvents or preferably at a relatively low temperature in an aqueous medium.

The dyestuffs obtained according to the processes described are new. They are valuable water-soluble dyestuffs which are suitable for dyeing and printing the most diverse materials, for example nitrogen-containing textile materials for example wool, silk, leather or synthetic polyamides, but especially polyhydroxylated materials of a fibrous structure, and in fact both synthetic fibres, for example of regenerated cellulose or viscose, and of natural materials, for example of linen or above all cotton.

The dyestuffs according to the invention which have been applied to the fibre by padding, printing or direct dyeing may be fixed by subjecting them to treatment with an alkali, for example, sodium carbonate, sodium hydroxide, alkaline earth hydroxides, trisodium phosphate and the like and to a heat treatment. The dyeing may for example be carried out at an elevated to moderately elevated temperature, for example at 50 to 100°, or, in the case of dichloro-triazine dyestuffs at a lower temperature, for example at about 20 to 50°. In order to exhaust the bath it is advisable to add more or less neutral, particularly inorganic, salts for example alkali metal chlorides or sulphates to the dyebath simultaneously with the dyestuffs or during the dyeing process. These salts may be added in portions if desired. During the dyeing process the dyestuffs react with the polyhydroxylated material which is to be dyed forming a covalent bond. The addition of acid-binding agents to the dyebath may take place at the beginning of the dyeing process; the alkaline agents are advantageously added in such a way that the pH-value of the dyebath which initially reacts weakly acid to neutral or weakly alkaline gradually rises during the entire dyeing process.

Instead of preparing the dyebaths in such a manner that the dyestuffs mentioned with or without the more or less neutral inorganic salts are simultaneously or separately and successively taken up in water, the dyestuffs and the salts may also be converted into pastes or preferably into dry preparations. Since some of the dyestuffs which can be used in accordance with the invention exhibit a certain sensitivity towards acids and strong alkalis owing to the presence of the labile substituents, it is advantageous in these cases not to admix any salts which react strongly alkaline in water to the dyestuff preparations which can be manufactured in this way. On the other hand, it is advantageous to isolate and dry the dyestuffs in the presence of salts which react weakly alkaline, for example mixtures of monosodium and disodium phosphates.

The dyestuffs according to the invention which contain at least one sulphonic acid group yield very valuable strong, and in most cases very full, luminous and frequently fluorescent dyeings and printings having excellent wet fastness properties on nitrogen-containing and also on polyhydroxylated, especially on cellulose-containing, textile substances. Apart from the dyeing of textile materials, the new dyestuffs may, owing to their fluorescene, also be used for marking purposes, for example in the microscopic investigation of vegetable or animal cell tissues.

In certain cases it may be advantageous to subject the textile dyeings obtainable according to the present process to an after-treatment. Thus the dyeings may be advantageously soaped so that any dyestuff which has not been completely fixed is removed.

In the examples which follow the parts, unless otherwise specified, denote parts by weight and the percentages denote percentages by weight. The relationship between parts by weight and parts by volume is the same as that between gram and cm.³.

EXAMPLE 1

4.57 parts of 3-aminopyrene-5,8,10-trisulphonic acid in 200 parts of water are neutralised with sodium hydroxide solution and 3.4 parts of anhydrous sodium acetate are added. A solution of 4 parts of 2,6-dichloro-5-chloromethyl-pyrimidine [manufactured according to the process of Brossmer and Rohm, A, 692, 119–133 (1966)] in 25 parts of acetone is poured into the resulting solution with intensive stirring, and the reaction mixture is heated to 60° C. for 10 to 15 hours. The resulting alkylated reaction product is then salted-out by adding potassium chloride, filtered and dried in vacuo at 60° C.

The reactive dyestuffs thus obtained dyes cotton and wool in exceptionally pure greenish-tinged yellow shades.

EXAMPLE 2

By replacing the 2,6-dichloro-5-chloromethyl-pyrimidine in Example 1 by 4.2 parts of 2,6-dichloro-5-chloromethyl-4-methylpyrimidine and proceeding otherwise as described, a dyestuff is obtained which also dyes cotton in dazzlyingly pure greenish-tinged yellow shades.

EXAMPLE 3

When in Example 1 the 3-aminopyrene-5,8,10-trisulphonic acid is replaced by an equivalent quantity of the mixture of 3-aminopyrene-5,8-disulphonic acid and 3-aminopyrene-5,10-disulphonic acid obtained on sulphonation of aminopyrene and the same procedure is followed, a dyestuff is obtained which also dyes cotton in dazzlyingly pure greenish-tinged yellow shades.

Dyeing instruction A 2 parts of the dyestuff obtained according to Example 1 are mixed with 25 parts of urea and dissolved in 75 parts of water. After adding 2 parts of sodium carbonate, a cotton fabric is impregnated with this solution, squeezed to 75% weight increase and dried. After a heat treatment for 5 minutes at 150° C. the material is rinsed and soaped. A greenish-tinged yellow fixed dyeing which is fast to boiling is obtained.

Dyeing instruction B 2 parts of the dyestuff manufactured according to Example 1 are dissolved in 95 parts of water. After cooling, 5 parts of 10 N sodium hydroxide solution and 2 parts of sodium chloride are added to the dyestuff solution. A cotton fabric is impregnated with this solution, squeezed to 60% weight increase and kept for 12 to 14 hours at room temperature in the moist state. It is then washed with cold and boiling water and dried. A greenish-tinged yellow dyeing having good fastness properties results.

Satisfactory fixing is also obtained after storing for 6 hours instead of for 12 to 14 hours.

Dyeing instruction C 100 parts of knitting wool are introduced at 50 to 80° C. into a dyebath which in 3000 parts of water contains 10 parts of crystalline sodium sulphate, 6 parts of 40% acetic acid, 0.5 part of an addition product of oleylamine and ethylene oxide and 2 parts of the dyestuff described in Example 1. The bath is heated to boiling during ½ an hour and dyeing is then carried out for 1 hour at the boil. The wool is then rinsed and dried. A uniform greenish-tinged yellow dyeing is obtained.

Printing instruction 2 parts of the dyestuff manufactured according to Example 1 are mixed with 20 parts of urea, dissolved in 28 parts of water, and stirred into 40 parts of 5% sodium alginate thickener. 10 parts of a 10% sodium carbonate solution are then added.

A cotton fabric is printed on a roller printing machine with the printing paste thus obtained, dried, and the resulting printed material is steamed for 8 minutes at 100° C. insaturated steam. The printed fabric is then thoroughly rinsed in cold and hot water whereby the constituents which have not been chemically fixed on the fibre can be very easily removed. It is then dried. A greenish-tinged yellow print having good fastness properties is obtained.

What is claimed is:

1. Water soluble dyestuffs of the formula

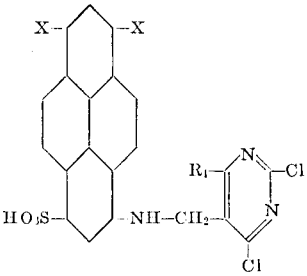

wherein $R_1$ is hydrogen or a lower alkyl group and each X is either hydrogen or a sulfonic acid group.

2. The dyestuffs as claimed in claim 1 and corresponding to the formula

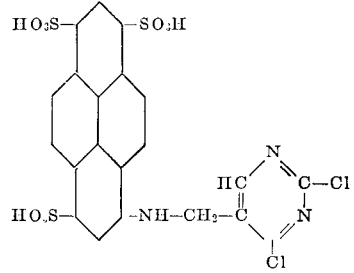

wherein $R_1$ is hydrogen or a lower alkyl group and each X is either hydrogen or a sulfonic acid group.

References Cited

UNITED STATES PATENTS 2,884,423    4/1959    Wilkinson _____ 260—256.5

ALEX MAZEL, Primary Examiner

R. J. GALLAGHER, Assistant Examiner

U.S. Cl. X.R.

8—54, 54.2

PO-1050
(5/69)

CASE 6236/E

UNITED STATES PATENT OFFICE
CERTIFICATE OF CORRECTION

Patent No. 3,555,027              Dated    January 12, 1971

Inventor(s)    KARL SEITZ

It is certified that error appears in the above-identified patent and that said Letters Patent are hereby corrected as shown below:

Column 4, line 35, delete "dyestuffs" and insert --- dyestuff ---.

Column 4, lines 50 and 51, delete "wherein $R_1$ is hydrogen or a lower alkyl group and each X is either hydrogen or a sulfonic acid group."

Signed and sealed this 22nd day of February 1972.

(SEAL)
Attest:

EDWARD M. FLETCHER, JR.
Attesting Officer

ROBERT GOTTSCHALK
Commissioner of Patents